US008233401B2

(12) United States Patent
Rosenberg et al.

(10) Patent No.: US 8,233,401 B2
(45) Date of Patent: Jul. 31, 2012

(54) USING AN IP REGISTRATION TO AUTOMATE SIP REGISTRATION

(75) Inventors: Jonathan D. Rosenberg, Freehold, NJ (US); Flemming Andreasen, Marlboro, NJ (US); Jayaraman Iyer, Sunnyvale, CA (US); Timothy Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1121 days.

(21) Appl. No.: 11/838,214

(22) Filed: Aug. 13, 2007

(65) Prior Publication Data

US 2009/0046703 A1    Feb. 19, 2009

(51) Int. Cl.
*H04L 12/28* (2006.01)

(52) U.S. Cl. ............................ 370/252; 370/254; 709/227

(58) Field of Classification Search .................. None
See application file for complete search history.

(56) References Cited

U.S. PATENT DOCUMENTS

| 6,304,567 | B1 | 10/2001 | Rosenberg |
| 6,937,597 | B1 | 8/2005 | Rosenberg et al. |
| 6,970,909 | B2 | 11/2005 | Schulzrinne |
| 7,170,863 | B1 | 1/2007 | Denman et al. |
| 7,170,887 | B2 | 1/2007 | Rosenberg |
| 7,302,255 | B1 * | 11/2007 | Lundy et al. ............... 455/414.1 |
| 7,395,336 | B1 * | 7/2008 | Santharam et al. ........... 709/227 |
| 7,436,848 | B1 * | 10/2008 | Lewis et al. .................... 370/462 |
| 7,480,723 | B2 * | 1/2009 | Grabelsky et al. ............ 709/228 |
| 7,526,296 | B1 * | 4/2009 | Lundy et al. .................. 455/461 |
| 7,532,615 | B2 * | 5/2009 | Krahn ............................ 370/352 |
| 7,542,573 | B2 * | 6/2009 | Ogawa et al. ................. 380/279 |
| 7,609,700 | B1 * | 10/2009 | Ying et al. ............... 370/395.21 |
| 7,634,558 | B1 * | 12/2009 | Mangal et al. ................ 709/224 |
| 7,647,374 | B2 * | 1/2010 | Rajahalme et al. ........... 709/204 |
| 7,761,571 | B2 * | 7/2010 | Bushmitch et al. ........... 709/226 |
| 7,792,906 | B2 * | 9/2010 | Garcia-Martin et al. ..... 709/206 |
| 7,940,722 | B1 | 5/2011 | Rosenberg et al. |
| 8,046,474 | B2 * | 10/2011 | Kato et al. ..................... 709/228 |
| 2002/0191597 | A1 | 12/2002 | Lundstrom |
| 2003/0069934 | A1 * | 4/2003 | Garcia-Martin et al. ..... 709/206 |
| 2004/0003241 | A1 | 1/2004 | Sengodan et al. |
| 2004/0176128 | A1 * | 9/2004 | Grabelsky et al. .......... 455/553.1 |

(Continued)

FOREIGN PATENT DOCUMENTS

EP    2135181    12/2009

(Continued)

OTHER PUBLICATIONS

U.S. Appl. No. 11/786,343, filed Apr. 11, 2007, Mark Grayson, et al.

(Continued)

*Primary Examiner* — Gregory Sefcheck
(74) *Attorney, Agent, or Firm* — Patent Capital Group

(57) ABSTRACT

In one embodiment, a network device receives an Internet protocol (IP) registration request, such as a mobile IP registration request, from an access terminal. The network device may be a home agent that is configured to register the access terminal for IP services at the network layer. In addition to registering the access terminal at the network layer, the network device may facilitate registration at another layer, such as the application layer. In one example, registration information for the access terminal for an application layer registration, such as information needed to register for a session initiation protocol (SIP) services, is determined. The network device then facilitates registration at the application layer automatically using the registration information.

19 Claims, 4 Drawing Sheets

U.S. PATENT DOCUMENTS

| | | | |
|---|---|---|---|
| 2004/0219905 A1 | 11/2004 | Blumenthal et al. | |
| 2005/0130659 A1 | 6/2005 | Grech et al. | |
| 2005/0210148 A1* | 9/2005 | Kato et al. | 709/244 |
| 2005/0233727 A1 | 10/2005 | Poikselka et al. | |
| 2005/0238002 A1 | 10/2005 | Rasanen | |
| 2005/0278532 A1 | 12/2005 | Fu et al. | |
| 2006/0098624 A1* | 5/2006 | Morgan et al. | 370/352 |
| 2006/0104262 A1 | 5/2006 | Kant et al. | |
| 2006/0133356 A1* | 6/2006 | Suzukawa | 370/352 |
| 2006/0140149 A1* | 6/2006 | Kim et al. | 370/331 |
| 2006/0155814 A1* | 7/2006 | Bennett et al. | 709/207 |
| 2006/0155850 A1* | 7/2006 | Ma et al. | 709/226 |
| 2006/0251043 A1 | 11/2006 | Madour et al. | |
| 2006/0251229 A1 | 11/2006 | Gorti et al. | |
| 2006/0294245 A1* | 12/2006 | Raguparan et al. | 709/227 |
| 2007/0043829 A1* | 2/2007 | Dua | 709/219 |
| 2007/0115935 A1* | 5/2007 | Qiu et al. | 370/352 |
| 2007/0143396 A1* | 6/2007 | Koora et al. | 709/203 |
| 2007/0153776 A1* | 7/2007 | Joseph et al. | 370/356 |
| 2007/0174443 A1* | 7/2007 | Shaheen et al. | 709/223 |
| 2007/0297373 A1* | 12/2007 | Saifullah et al. | 370/338 |
| 2009/0016302 A1* | 1/2009 | Shaheen | 370/331 |
| 2009/0031016 A1* | 1/2009 | Nakai | 709/223 |
| 2009/0164647 A1* | 6/2009 | Araki et al. | 709/228 |
| 2009/0296690 A1* | 12/2009 | Garcin et al. | 370/352 |
| 2012/0036184 A1* | 2/2012 | Chaudhari et al. | 709/203 |

FOREIGN PATENT DOCUMENTS

| | | |
|---|---|---|
| WO | WO 2008/127877 | 10/2008 |

OTHER PUBLICATIONS

ETSI, "TISPAN: Presentation Defining the Next Generation Network," Telecoms and Internet converged Services and Protocols for Advanced Network, Feb. 2007; 3 pages http://www.etsi.org tispan/.

PCT Jun. 27, 2008 International Search Report PCT/US08/59203; 1 page.

PCT Apr. 11, 2007 International Preliminary Report on Patentability (1 page) and Written Opinion of the International Searching Authority (4 pages) for PCT/US08/59203.

"How to indicate to the GGSN that a mobile is using a GAN/GSM/UMTS/HSDPA cell?" Vodafone, 2 pages, 3GPP TSG-SA WG2 #51, TDoc S2-060797, Feb. 13-17, 2006, Denver.

"PS domain location based charging at the GGSN," 2 pages, 3GPP TSG SA WG2 Architecture—S2#52, S2-06159508, May 12, 2006, Shanghai, China.

PRC Aug. 24, 2011 SIPO First Office Action from Chinese Application No. 200880011374.3; 6 pages.

PRC Jan. 9, 2012 Response to SIPO First Office Action mailed Aug. 24, 2011 from Chinese Application No. 200880011374.3; 14 pages.

Rosenberg, J., et al., "Indicating User Agent Capabilities in the Session Initiation Protocol (SIP)," Network Working Group RFC 3840, Aug. 2004; 37 pages http://tools.ietf.org/html/rfc3840.

* cited by examiner

USING AN IP REGISTRATION TO AUTOMATE SIP REGISTRATION

TECHNICAL FIELD

Particular embodiments generally relate to networking.

BACKGROUND

In the voice over Internet protocol (VoIP) architecture, the start-up process may include many steps. For example, when an access terminal powers on, it must connect to the radio network, obtain IP and mobile IP registration, and then perform application layer registrations. This start-up process may be time-consuming and is particularly problematic during an avalanche re-start, which is when a network outage causes a large number of access terminals to lose connectivity and re-start around the same time. When the network heals, the access terminals simultaneously discover this and begin the reconnection process. This causes a flood of re-starts that can cause problems and congestion on the network.

DESCRIPTION OF EXAMPLE EMBODIMENTS

Overview

In one embodiment, a network device receives an Internet protocol (IP) registration request, such as a mobile IP registration request, from an access terminal. The network device may be a home agent that is configured to register the access terminal for IP services at the network layer. In addition to registering the access terminal at the network layer, the network device may facilitate registration at another layer, such as the application layer. In one example, registration information for the access terminal for an application layer registration, such as information needed to register for session initiation protocol (SIP) services, is determined. The network device then facilitates registration at the application layer using the network layer registration information.

The network device facilitates the registration automatically upon receiving the IP registration request from the access terminal. For example, the network device may access a database to bind a username for the access terminal to the registration information. In one example, the username may be bound to an IP address and port. Also, the network device may communicate with an application layer device to cause registration. For example, the application layer device may construct and send a SIP REGISTER message to start the registration process for the access terminal. Also, the application layer device may access the database to bind the registration information to the username. Accordingly, the access terminal does not need to separately register at the application layer once the IP registration is performed. Rather, the network device may facilitate this registration.

Example Embodiments

Figure 1:
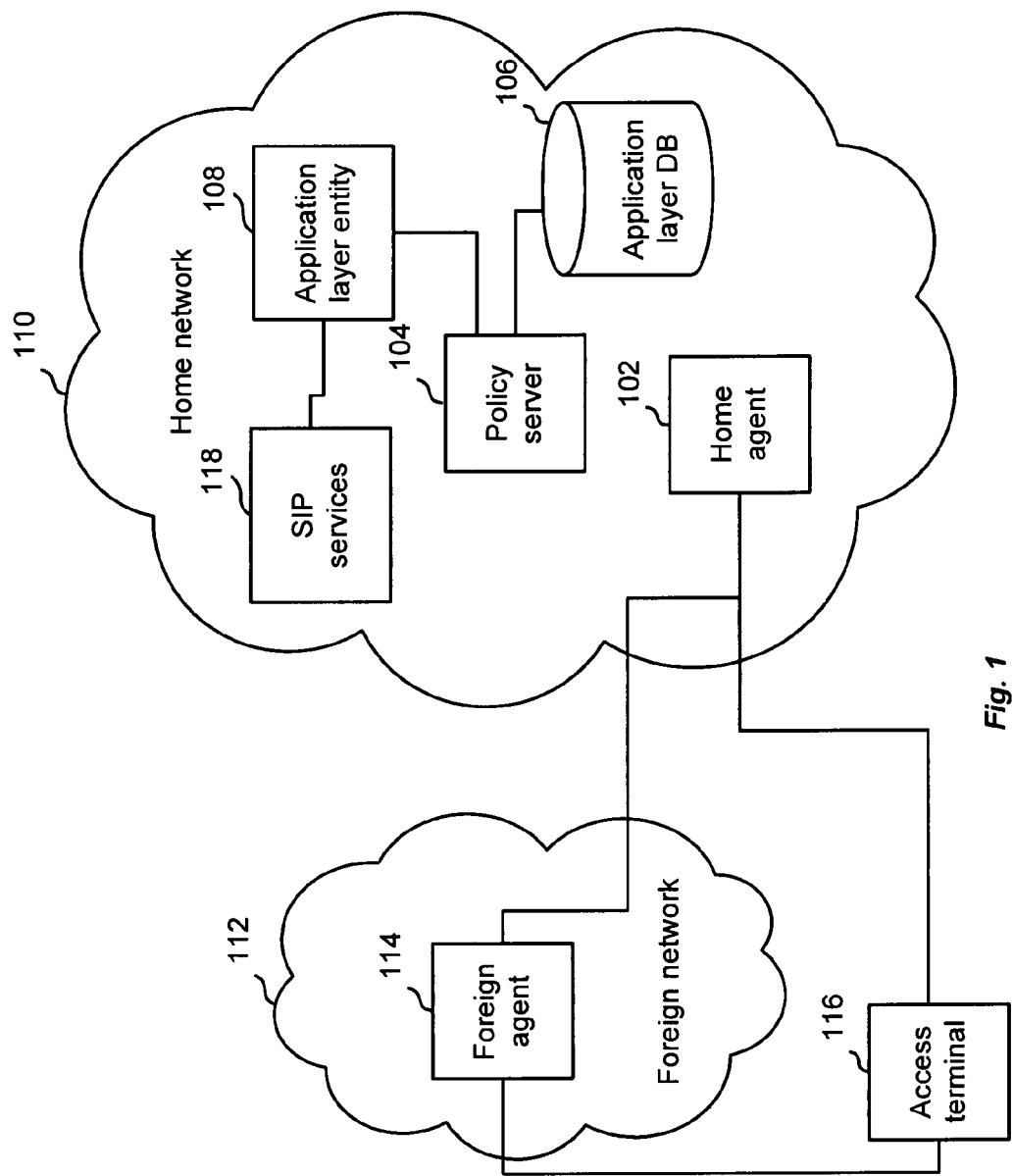
FIG. 1 depicts an example of a system for automating registration.

FIG. 1 depicts an example of a system for automating registration. Although the network shown in FIG. 1 will be described, it will be understood that variations in the network will be appreciated, such as a network infrastructure that is not mobile-IP based may be used.

The system may include a home network 110 and/or a foreign network 112. Home network 110 may be a physical or virtual network that may have a network prefix matching that of a home address for access terminal 116. Foreign network 112 may be a visited network in which access terminal 116 has roamed and has attached to.

Access terminal 116 may be a mobile device, such as a cellular phone, personal e-mail device, personal digital assistant (PDA), IP phone, etc. In one embodiment, access terminal 116 may be an integrated device, which may be a single device that provides data services and voice services for the same user. For example, a service provider assigns a single user to access terminal 116, which can provide both voice and data services to the user. The voice and data services may require separate registrations.

A home agent 102 may be a network device, such as a router, that is found in home network 110. Home agent 102 may also be referred to as Gateway GPRS Support Node (GGSN) or may be other suitable network devices to enable IP registration (with or without support for mobility). Home agent 102 is configured to send packets to access terminal 116. In one embodiment, access terminal 116 may register with home network 110 while it is in the range of home network 110. Also, access terminal 116 may roam to foreign network 112 and attach to foreign agent 114. Foreign agent 114 may be a network device, such as a router, that provides routing services to access terminal 116 while it is attached to foreign network 112. Access terminal 116 needs to register with home network 110 when it attaches to foreign agent 114. After registering, home agent 102 and foreign agent 114 may facilitate routing of packets to access terminal 116 when it is attached to foreign network 112. Although a mobile IP infrastructure is described with foreign network 112, it will be understood that particular embodiments may also be used when access terminal 116 is not roaming in foreign network 112.

Particular embodiments recognize that registration may need to occur at many layers in a network. Rather than repeating the process independently, registration at one layer is used to bootstrap registration at another. For example, when mobile IP registration occurs, information determined during that process is used to automatically perform registration at the application layer. This reduces network load by eliminating additional messages and processing. It also improves start-up time for access terminals 116. This may be especially important during an avalanche re-start where multiple access terminals 116 are attempting to re-establish a connection with home network 110.

In one embodiment, when access terminal 116 attaches to home network 110, home agent 102 may facilitate an IP registration, such as a mobile IP registration to access IP services (e.g., data services). Home agent 102 may determine an IP address for access terminal 116. Also, a port may also be determined. The IP address and port may be used for communications to/from access terminal 116.

When access terminal 116 registers with home agent 102, home agent 102 may facilitate registration for access terminal 116 at another layer, such as the application layer. For example, home agent 102 may cause a SIP registration for SIP services 118, such as media services, on behalf of access terminal 116. This may be performed automatically when access terminal 116 performs an IP registration at the network layer. There may be rules that specify when the automatic registration should be performed at the application layer. For example, if a user is not connected to an application layer service, then the automatic registration may be performed. Also, some users may want to be automatically registered for the application layer service. Further, information in the network layer registration may indicate that registration at the application layer is needed.

To automatically perform the registration at a different layer, information determined in the IP registration may be used to automatically register access terminal 116 at the application layer. For example, the IP address allocated to access terminal 116 and a port may be used in the application layer registration. The application layer registration generally needs to have an IP address and port bound to a username. The username is obtained as part of the IP registration, either directly from access terminal 116, or indirectly through some other entity or function, and may be subject to authentication. Other information such as the full path and capabilities may also be determined, which will be described in more detail below.

Home agent 102 may facilitate the application layer registration in different ways. For example, home agent 102 may store registration bindings for access terminal 116 in an application layer database 106. In one example, during application layer registration, a username for a user of access terminal 116 needs to be bound to the IP address and port in database 106. SIP services 118 may use database 106 to determine if access terminal 116 is registered to receive services. Accordingly, if the registration information is bound in application layer database 106, then SIP services 118 may access the information to provide the services to access terminal 116. Methods other than binding the registration information to the username may be used to automatically register access terminal 116. For example, flags may be set to register access terminal 116 or other information may be stored in database 106 to register access terminal 116 at the application layer.

In another example, home agent 102 may contact a policy server 104 to facilitate the registration. Policy server 104 may be a network device that may be configured to authorize the IP registration. When policy server 104 is contacted during the IP registration, policy server 104 may also perform the application layer registration. For example, policy server 104 may access database 106 and bind the IP address and port to the username. Further, policy server 104 may contact an application layer entity 108, which may be any module or device that can perform the application layer registration, such as a serving control session control function (S-CSCF), proxy, application manager, or any other SIP entity configured to perform registrations. For example, as will be described in more detail below, policy server 104 may construct a SIP REGISTER message using the registration information and send it to application layer entity 108. The registration process may then proceed between policy server 104 and application layer entity 108. One advantage of having policy server 104 send the REGISTER message is that it is trusted by application layer entity 108. This is because policy server 104 and application layer entity 108 may already be in a trusted relationship from being in home network 110. Home Agent 102 has already authenticated the user at the network layer, thus, challenge/response messages, or other authentication messages, do not need to be sent at the application layer as would be the case if a non-trusted entity is attempting to register. Thus, application layer registration can be automated because home agent 102 obtains (authenticated, or otherwise trustworthy) identity information at the network layer during IP registration. This identity information is then associated with an IP-address and application-specific port to facilitate registration at the application layer.

Accordingly, an automated registration at the application layer is provided when access terminal 116 registers at the network layer. The application layer registration uses information determined in the network layer registration to perform the application layer registration. This reduces messaging between access terminal 116 and other network entities in home network 110 and thus may reduce congestion on the network.

Figure 2:
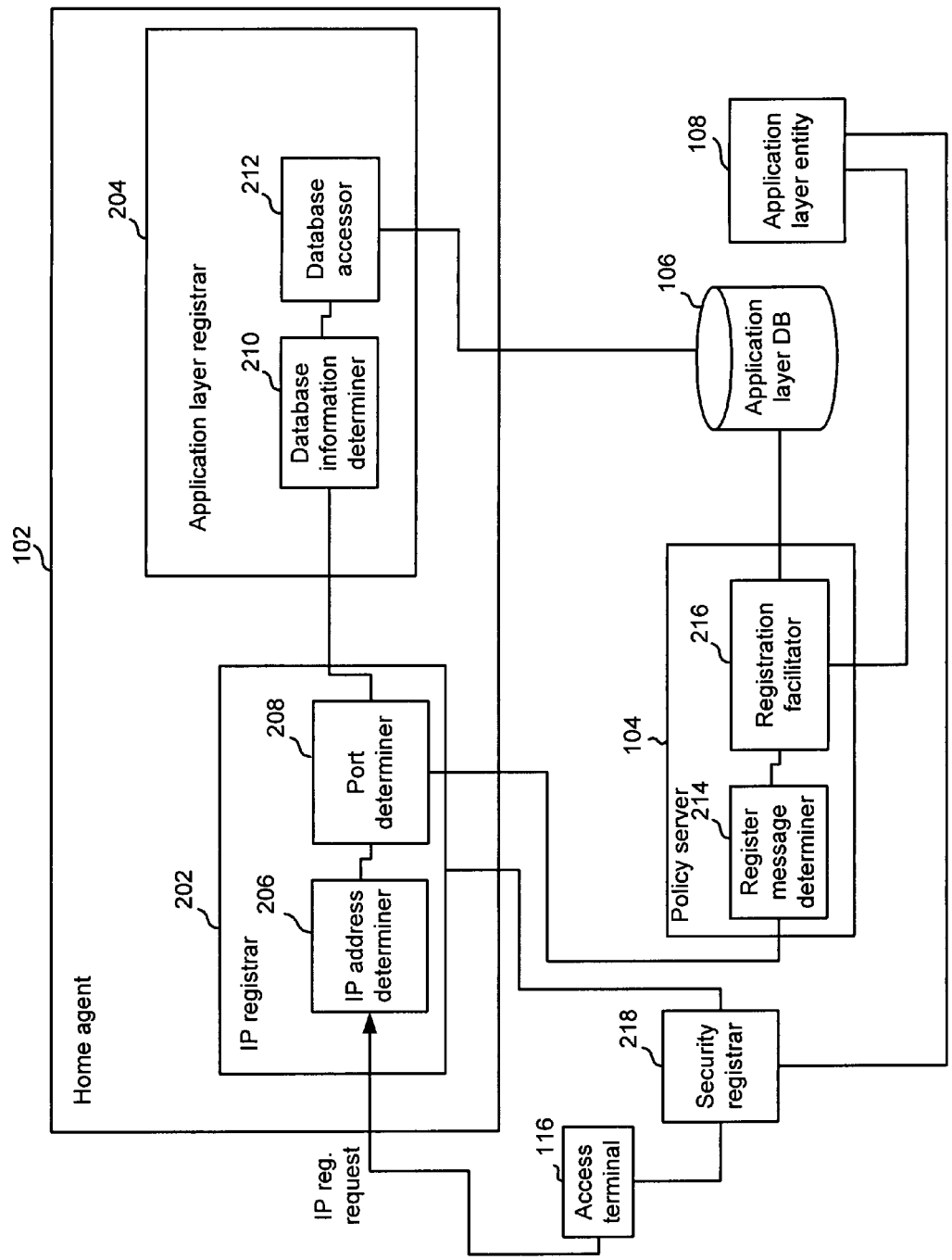
FIG. 2 shows a more detailed example of the system shown in FIG. 1.

The automated application layer registration will now be described in more detail. FIG. 2 shows a more detailed example of the system shown in FIG. 1. Home agent 102 may include an IP registrar 202 and an application layer registrar 204. IP registrar 202 may receive an IP registration request from access terminal 116. The IP registration request may be received from access terminal 116 and/or foreign agent 114. For example, access terminal 116 may be found within home network 110 or may be roaming and attached to foreign network 112. IP registrar 202 may be configured to determine an identity of access terminal 116. For example, access terminal 116 may provide the identity when it is authenticated. The identity may be telephone number, username, or other information.

An IP address determiner 206 may determine an IP address for access terminal 116. The IP address may be determined in any way. In one example, if access terminal 116 is in home network 110, the home address allocated to access terminal 116 may be used. IP address determiner 206 may know the identity of access terminal 116 and thus can determine what IP address has been allocated to it. Also, if access terminal 116 has roamed to foreign network 112, then the foreign care of address may also be noted.

Port determiner 208 may then determine a port for access terminal 116. In one example, a default port may be used, such as a default port for mobile IP communications may be assigned to access terminal 116.

An application layer registrar 204 to facilitate application layer registration. For example, application layer registrar 204 includes a database information determiner 210 that may determine information that needs to be bound to a username for access terminal 116 in database 106. For example, the IP address and port may be determined using the identity of access terminal 116. The IP address may have been assigned during registration. The port may be application specific. For example, different default ports may be used for different applications. Then, the identity may be used to determine a username or address of record (AoR). Accordingly, application layer registrar 204 may facilitate application layer registration for home agent 102.

A database accessor 212 may then access database 106. The access may be through an application programming interface (API) or any other methods. Information needed to register access terminal 116 is then stored in database 106. For example, a binding between the username and port/IP address is entered into database 106.

In another example of registering access terminal 116, during the IP registration, IP registrar 202 may contact policy server 104 to perform the IP registration. Although policy server 104 is described as being contacted, it will be understood that home agent 102 may also perform the functions of policy server 104. Policy server 104 may be configured to authorize registration of access terminal 116 at the network layer. Once policy server 104 authorizes the IP registration, policy server 104 may facilitate the application layer registration. For example, a registration message determiner 214 may construct a SIP REGISTER message using the information it learned during the IP registration. Registration message determiner 214 may determine the IP address, port, and any other information that is needed for a SIP REGISTER message. The IP address allocated to the user can be used to construct a Contact header field, (e.g. SIP:IP address) and the identity of access terminal 116 can be used to derive the AoR.

A registration facilitator 216 then communicates the SIP REGISTER message to application layer entity 108. Because policy server 104 may be a trusted entity to application layer entity 108, and trusted home agent 202 authenticated (implicitly or explicitly) access terminal 116, the REGISTER message may not be challenged.

In another embodiment, registration facilitator 216 may facilitate registration of access terminal 116 by storing the necessary information directly into database 106. This may be performed as described above with respect to home agent 102.

As discussed above, other information may be needed for the application layer registration. For example, the REGISTER message may also have additional functions other than providing the IP address and port of access terminal 116. For example, it may be used to establish a full path for inbound and outbound messaging to and from access terminal 116. The path and service-route header fields in a SIP REGISTER message may provide this information. Also, the REGISTER message may provide capabilities of access terminal 116 to the network and any other network devices, such as IP multimedia subsystem (IMS) entities. In one example, the assigned application layer entities, such as the CSCFs, may be provided during access authentication or IP registration. This provides the service route that access terminal 116 would otherwise provide through its REGISTER message. The path may be determined by home agent 102 on its own when the P- and S-CSCFs are in home network 110. Also, the capabilities of access terminal 116 may be known to a service provider as part of the device provisioning and these parameters may be entered into database 106 ahead of time and activated when access terminal 116 registers. The path and capabilities may also be determined in other ways.

During application layer registration, security parameters may be set up at the application layer. In one example, a security registrar 218 may be used to set up the security association. The IP registration may be used to convey security parameters to application layer entity 108. These security parameters may also be conveyed to access terminal 116 during the IP registration. This allows access terminal 116 and application layer entity 108 to substantiate the security association without additional explicit signaling. Alternatively, access terminal 116 may use dynamic transport layer security (DTLS) or transport layer security (TLS) procedures to establish a secure connection but omit the SIP REGISTER at the end of the procedure. The identity of access terminal 116 may be determined from the source IP address of access terminal 116 that may be verified by return routability during the TLS handshake. A secure tunnel, such as an IPsec tunnel, may be established without the parameters being exchanged using a SIP REGISTER exchange between access terminal 116 and application layer entity 108. Also, other methods may be used to set up the security association between access terminal 116 and application layer entity 108.

Figure 3:
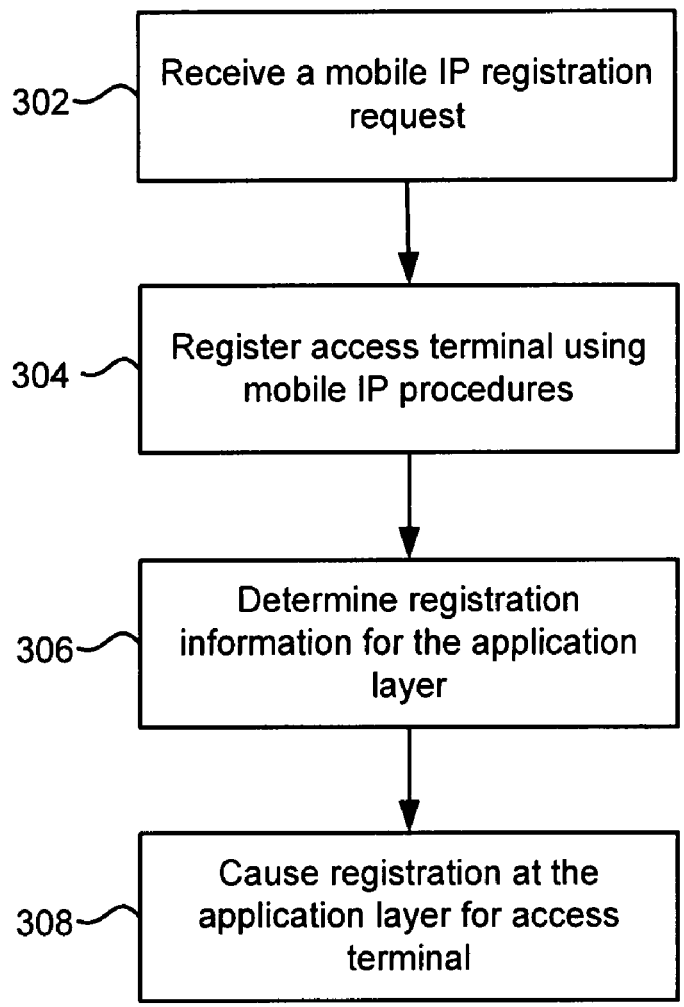
FIG. 3 depicts an example of a method for performing an automated application layer registration.

FIG. 3 depicts an example of a method for performing an automated application layer registration. Step 302 receives a mobile IP registration request. Step 304 then registers access terminal 116 using mobile IP procedures. During the procedures, an IP address and port may be determined that can be used to automatically register access terminal 116 at the application layer.

Step 306 then determines registration information for the application layer. For example, the IP address and port previously determined are used to associate the user with for the application in question. Also, the path for messaging with access terminal 116, security association information, and other information needed for registration may be determined.

Figure 4:
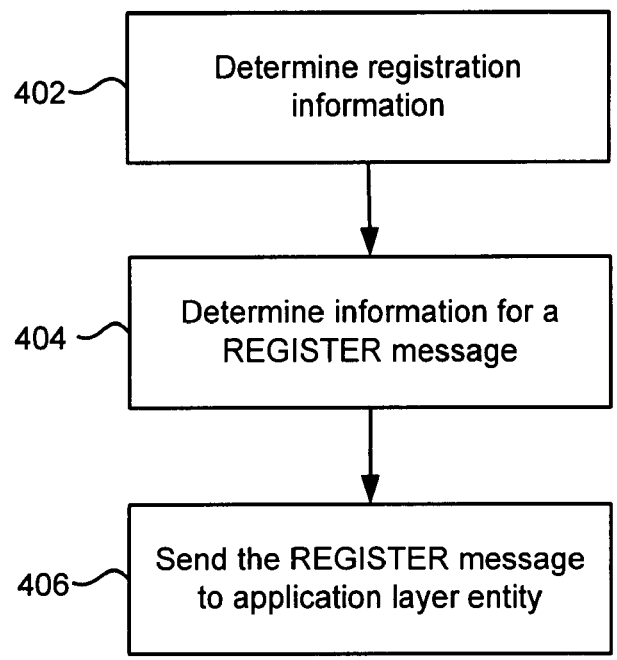
FIG. 4 shows an example of facilitating registration at the application layer using a policy server.

Step 308 then facilitates registration at the application layer for access terminal 116. This registration may be facilitated in many ways. In one embodiment, FIG. 4 shows an example of facilitating registration at the application layer using policy server 104. Step 402 determines registration information. For example, policy server 104 may receive the registration information from home agent 102.

Step 404 then determines information for a REGISTER message. For example, information needed for a SIP REGISTER message, such as the IP address, port, and the identity of access terminal 116 are determined. This information may then be inserted in the REGISTER message.

Step 406 then sends the REGISTER message to application layer entity 108. Further messaging, as needed, may be performed to register access terminal 116.

Figure 5:
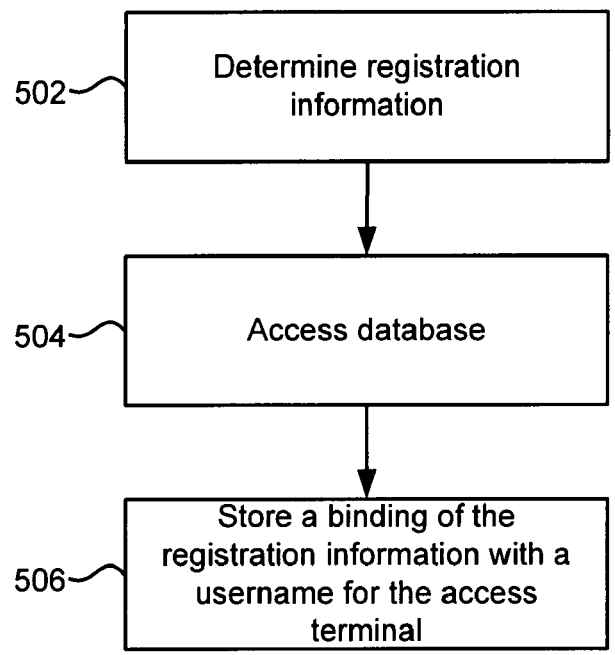
FIG. 5 shows another example of registering an access terminal.

In another embodiment, FIG. 5 shows another example of registering access terminal 116. Step 502 determines registration information. For example, the registration information may be determined by home agent 102 and/or policy server 104.

Step 504 then accesses database 106. For example, home agent 102 or policy server 104 may access database 106 through an API.

Step 506 then stores a binding of the registration information with a username for access terminal 116. For example, the username is bound to the IP address and port that was determined for access terminal 116. Also, any other information that is needed may be bound to the username, such as capability parameters, the full path for inbound and outbound messaging, etc.

Particular embodiments provide many advantages. For example, network load and processing may be reduced by eliminating messaging with access terminal 116. This may be important during an avalanche restart. Also, startup time for access terminals 116 may be reduced.

Although the description has been described with respect to particular embodiments thereof, these particular embodiments are merely illustrative, and not restrictive. Although mobile IP is discussed, it will be understood that the automated registrations may be performed on any layers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, and transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:

receiving, at a network device, an Internet Protocol (IP) registration request associated with an access terminal;

initiating, at the network device, IP registration of the access terminal, wherein initiating IP registration includes determining IP registration information of the access terminal;

identifying at least a portion of the determined IP registration information for use in an application layer registration of the access terminal, the portion of the determined IP registration information including an Internet Protocol (IP) address of the access terminal, a port of the access terminal associated with a particular application, and an identity for the access terminal;

associating the identified identity for the access terminal with the identified IP address of the access terminal and identified port of the access terminal; and facilitating registration of the access terminal at the application layer using at least the identified portion of the IP registration information, the registration at the application layer being initiated automatically by the network device upon receiving the IP registration request, wherein facilitating registration includes causing communication, to an application layer entity, of the association of the identified identity for the access terminal with the identified IP address of the access terminal and identified port of the access terminal.

2. The method of claim 1, wherein causing communication, to an application layer entity, of the association of the identified identity for the access terminal with the identified IP address of the access terminal and identified port of the access terminal includes storing the association of the identified identity for the access terminal with the identified IP address of the access terminal and identified port of the access terminal in an application layer database used by the application layer entity during the application layer registration.

3. The method of claim 1, wherein causing communication, to an application layer entity, of the association of the identified identity for the access terminal with the identified IP address of the access terminal and identified port of the access terminal includes:
generating an application layer registration message identifying the association of the identified identity for the access terminal with the identified IP address of the access terminal and identified port of the access terminal; and
sending the application layer registration message to an application layer entity for registering the access terminal.

4. The method of claim 3, wherein the network device is trusted by the application layer entity and therefore separate authentication of the user is not needed by the application layer entity.

5. The method of claim 1, further comprising:
determining a full path for messaging with the access terminal and capability parameters for the access terminal; and
providing the full path and capability parameters in facilitating the registration.

6. The method of claim 1, further comprising:
determining security parameters during the IP registration;
sending the security parameters to an application layer entity; and
sending the security parameters to the access terminal, wherein the application layer entity and access terminal can form a security association for communications at the application layer using the security parameters.

7. The method of claim 1, further comprising authenticating the access terminal at the network layer, wherein the IP registration information is authenticated and allows authentication to not be needed at the application layer.

8. The method of claim 1, wherein the identity for the access terminal includes a username associated with the access terminal.

9. An apparatus comprising:
one or more processors; and
logic encoded in one or more tangible media for execution by the one or more processors and when executed operable to:
receive, at a network device, an Internet Protocol (IP) registration request associated with an access terminal;
initiate, at the network device, IP registration of the access terminal, wherein initiating IP registration includes determining IP registration information of the access terminal;
identify at least a portion of the determined IP registration information for use in an application layer registration of the access terminal, the portion of the determined IP registration information including an Internet Protocol (IP) address of the access terminal, a port of the access terminal associated with a particular application, and an identity for the access terminal;
associate the identified identity for the access terminal with the identified IP address of the access terminal and identified port of the access terminal; and
facilitate registration of the access terminal at the application layer using at least the identified portion of the IP registration information, the registration at the application layer being initiated automatically by the network device upon receiving the IP registration request, wherein facilitating registration includes causing communication, to an application layer entity, of the association of the identified identity for the access terminal with the identified IP address of the access terminal and identified port of the access terminal.

10. The apparatus of claim 9, wherein causing communication, to an application layer entity, of the association of the identified identity for the access terminal with the identified IP address of the access terminal and identified port of the access terminal includes storing an indication of the association of the identified identity for the access terminal with the identified IP address of the access terminal and identified port of the access terminal, in an application layer database used by an application layer entity during the application layer registration.

11. The apparatus of claim 9, wherein causing communication, to an application layer entity, of the association of the identified identity for the access terminal with the identified IP address of the access terminal and identified port of the access terminal includes:
generating an application layer registration message using the IP registration information; and
sending the application layer registration message to an application layer entity for registering the access terminal.

12. The apparatus of claim 11, wherein the network device is trusted by the application layer entity and therefore separate authentication of the user is not needed by the application layer entity.

13. The apparatus of claim 9, wherein the logic when executed is further operable to:
determining a full path for messaging with the access terminal and capability parameters for the access terminal; and
operable to:
providing the full path and capability parameters in facilitating the registration.

14. The apparatus of claim 9, wherein the logic when executed is further determining security parameters during the IP registration;
sending the security parameters to an application layer entity; and
sending the security parameters to the access terminal, wherein the application layer entity and access terminal can form a security association for communications at the application layer using the security parameters.

15. The apparatus of claim 9, further comprising authenticating the access terminal at the network layer, wherein the IP registration information is authenticated and allows authentication to not be needed at the application layer.

16. A system comprising:

an access terminal; and a network device configured to:

receive an Internet Protocol (IP) registration request associated with an access terminal;

initiate IP registration of the access terminal, wherein initiating IP registration includes determining IP registration information of the access terminal;

identify at least a portion of the determined IP registration information for use in an application layer registration of the access terminal, the portion of the determined IP registration information including an Internet Protocol (IP) address of the access terminal, a port of the access terminal associated with a particular application, and an identity for the access terminal;

associate the identified identity for the access terminal with the identified IP address of the access terminal and identified port of the access terminal; and facilitate registration at the application layer using at least the identified portion of the IP registration information, the registration at the application layer being initiated automatically by the network device upon receiving the IP registration request, wherein facilitating registration includes causing communication, to an application layer entity, of the association of the identified identity for the access terminal with the identified IP address of the access terminal and identified port of the access terminal.

17. The system of claim 16, further comprising:

a policy server configured to receive a message from the network device during IP registration, the policy server configured to facilitate registration at the application layer.

18. The system of claim 17, wherein the policy server is configured to:

construct an application layer registration message communicating the association of the identified identity for the access terminal with the identified IP address of the access terminal and identified port of the access terminal, and send the application layer registration message to the application layer entity for application layer registration.

19. The system of claim 16, wherein the access terminal is an integrated device configured to provide voice and data services to a single user.

* * * * *